Figure 1:
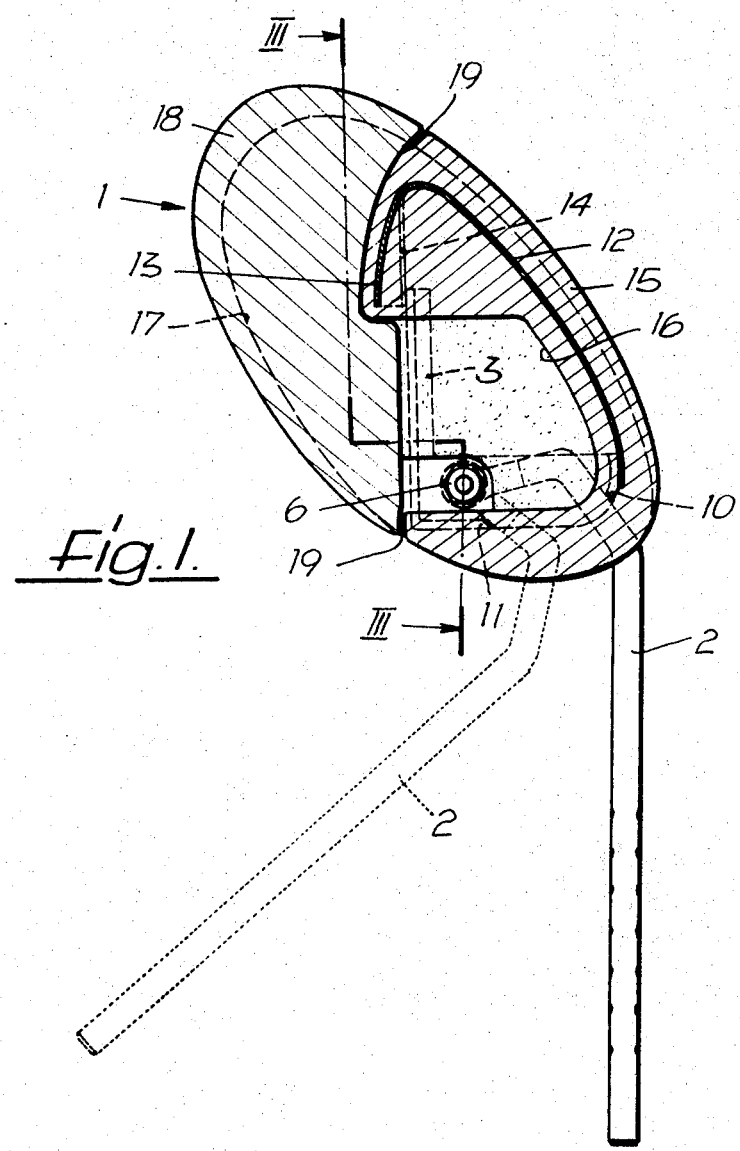

United States Patent

Faust et al.

[15] 3,650,561
[45] Mar. 21, 1972

[54] HEADREST

[72] Inventors: Eberhard O. Faust, Bernhausen; Klaus Keith, Darmsheim, both of Germany

[73] Assignee: Recaro A.G., Glarus, Switzerland

[22] Filed: Aug. 22, 1969

[21] Appl. No.: 852,199

[30] Foreign Application Priority Data

Aug. 28, 1968 Germany ...................P 17 80 300.8

[52] U.S. Cl............................................297/391, 297/220
[51] Int. Cl......................A47c 1/10, A47c 7/12, A61g 15/00
[58] Field of Search.............297/391 X, 410, 217, 61, 188, 297/220, 221

[56] References Cited

UNITED STATES PATENTS

| 3,205,005 | 9/1965 | Brown | 297/397 |
|---|---|---|---|
| 3,528,703 | 9/1970 | Ohta | 297/397 X |
| 3,046,057 | 7/1962 | Smetko | 297/397 |
| 2,973,029 | 2/1961 | Schlosstein | 297/216 |
| 3,325,214 | 6/1967 | McQueeney | 297/391 |
| 3,328,082 | 6/1967 | Lilleso | 297/397 X |
| 3,366,417 | 1/1968 | Belk | 297/397 |

Primary Examiner—Paul R. Gilliam
Attorney—Arthur O. Klein

[57] ABSTRACT

A headrest for a seat of a motor vehicle which is especially designed for protecting the seat occupant and a person sitting behind him from injuries especially in accidents. It comprises two complementary parts of foam plastic which are connected to each other and one of which is soft and resilient and forms the part on which the seat occupant may rest his head or neck, while the second part is of a harder and tough composition with a smooth outer surface and has embedded therein a curved reinforcing plate of a solid but deformable material which is secured to an angle bracket which is pivotably connected at the inside of the second part to supporting rods which may be secured to the backrest of the seat.

11 Claims, 3 Drawing Figures

Inventors:
Eberhard O. FAUST
Klaus KEITH
by Arthur O. Klein
ATTORNEY

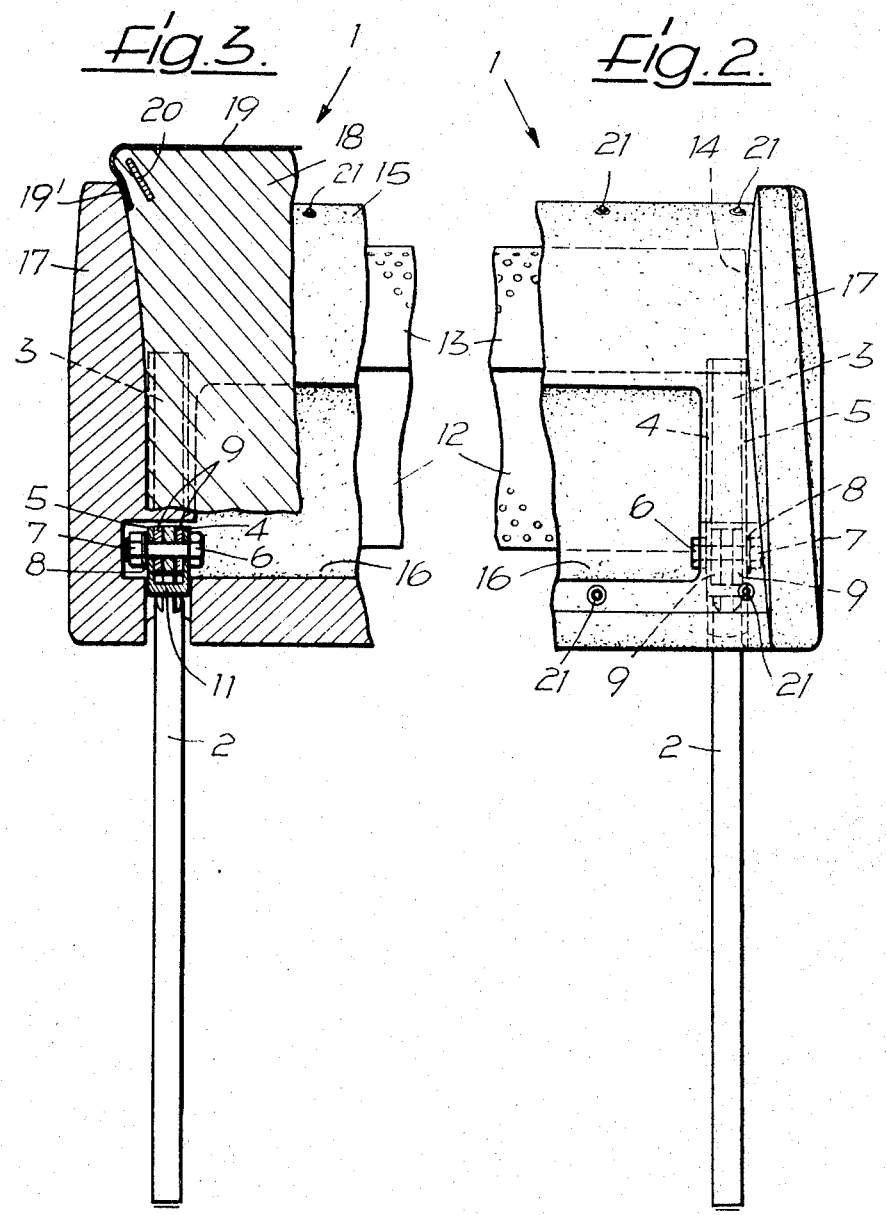

HEADREST

The present invention relates to a headrest which is especially suitable for being mounted on the backrest of a seat of a motor vehicle and provided at the inside with a deformable bracing element and with at least one joint for connecting a supporting bracket carrying the headrest to the deformable bracing element which carries a layer of an elastic cushion material.

In the construction of headrests for the seats of motor vehicles the question of a protection from injuries of the head or the cervical vertebrae of a person was until recently either not considered at all or only insufficiently and the principal purpose for which such a headrest was designed was to permit the seat occupant to rest his head or neck against it so as to provide him with a greater comfort and relaxation, especially also when the seat was adjusted to the reclining position. One of the reasons why the known types of headrests do not provide any real protection of the seat occupant from an injury to his cervical vertebrae as it may occur due to a sudden forward acceleration, for example, at an impact upon the vehicle from the rear, is the fact that in the normal sitting position the seat occupant cannot rest his head or neck upon the headrest since this headrest is located too far toward the rear. However, even if one of these known headrests is mounted sufficiently far forwardly it is so highly elastic that it will not prevent an excessive movement of the head toward the rear. Instead of sufficiently absorbing the force of an impact of the head, such a headrest will usually tend to propel the head back in the opposite direction.

If in motor vehicles several seats are mounted behind each other, it is also very important that the safety of the person sitting behind a seat which is equipped with a headrest be given adequate consideration since such a person may, for example, at a head-on collision of the vehicle, be propelled against the seat in front of him and against the headrest of this seat. Frequently the supports of such a headrest extend laterally outside of the latter. These exposed supports are just as much a source of danger as uncushioned structural parts, for example, the plate which is frequently provided on the lower side of a headrest for securing one or two supporting brackets thereto.

Since at an impact of the head of a person upon a headrest the distance of the movement of the head might be relatively small before it is stopped, a very high deceleration of this movement might occur. It is therefore also important that the head-supporting surface of the headrest be made of a sufficient size so that the specific pressure which it may exert upon the head at an impact will not exceed a certain value but will be distributed over a larger area. Finally the headrest should be capable of absorbing and thus destroying the energy of an impact to such an extent that the head hitting the headrest will not again be propelled back by it.

It is therefore an object of the invention to provide a headrest which will comply with all these requirements which none of the known types of headrests have been able to do.

Proceeding from a headrest of the type as mentioned at the beginning of this specification, this object is attained according to the invention by covering at least those parts of the deformable bracing element which are not covered by the layer of the elastic cushion material with a molded body which consists of a relatively hard and tough foam plastic.

The advantage of such a headrest consists primarily in the fact that the occupant of the seat which is provided with this headrest and a person sitting behind him will be protected as much as possible from the danger of being injured. This advantage is due to the particular structure of the deformable bracing element, the molded body and the cushion element and also to the facts that the upper end of the supporting bracket is located at the inside of the headrest, that a cushioning part is also provided on its lower side, and that by providing at least one hollow space at the inside of the headrest, the degree of deformability of the molded body and the cushion element is increased. It is another important advantage of the headrest according to the invention that it may be easily produced and installed. This is due to the fact that the connection between the supporting bracket and the bracing element, which may consist, for example, of a pivotable joint, may be completed before the layer of the cushion material is applied. This cushion element may likewise be applied in a very simple manner either by gluing or welding or, for example, by means of snap button or zip fasteners.

Another feature of the invention which is provided in a very advantageous embodiment of the headrest consists in providing at the inside of the headrest at least one hollow space as mentioned above which is partly enclosed by the deformable bracing element and is open toward the front thereof before the cushion element is applied which consists of a relatively soft material and closes the hollow space and may be connected to the bracing element.

Apart from increasing the deformability of the bracing element, the hollow space within the latter has the advantage of reducing the amount of material which is required for making the molded body. This is of importance especially if this molded body is made of a foam plastic of a type the outer surface of which has an appearance and property similar to that of synthetic leather so that this molded body does not need to be provided with an additional covering material. Such a covering material does then only have to be provided on the soft cushion element.

Another feature of the invention consists in providing the molded body of the kind as last described with outer wall-like projections which are integral with this body and at least partly cover up and engage with the lateral supports of this soft element.

According to another feature of the invention it is advisable to employ a highly elastic covering material on the cushion element. Such a material may be applied over the edges of the cushion element without forming any creases or folds. The free edges of this covering material are then covered by the projecting sidewalls of the molded body and therefore do not need to be sewed by an expensive additional operation. Since the cushion element only needs to extend over an area upon which the head and neck of the seat occupant may rest, it is also possible to cover it with a hoselike covering.

These and additional features and advantages of the present invention will become further apparent from the following detailed description thereof which is to be read with reference to the accompanying drawings, in which FIG. 1 shows a cross section of the headrest according to the invention;

FIG. 2 shows a front view of one lateral side of the headrest from which the cushion element is removed; while FIG. 3 shows a cross section which is taken along the line III—III of FIG. 1.

In the drawings, the numeral 1 designates generally a headrest according to the invention for the backrest of a seat of a motor vehicle. This headrest 1 has a substantially oval cross section and is supported by two rod-shaped supporting brackets 2 the lower ends of which are secured to the backrest of a seat and are adjustable to different heights, while their upper ends are bent forwardly so as to permit the headrest 1 to be placed sufficiently far in front of the backrest. Each of the rods 2 is pivotably mounted at the inside of the headrest on an angle bracket 3 one arm of which extends substantially upwardly while its other arm extends substantially toward the rear and is bifurcated and consists of two adjacent flat bars 4 and 5 which are laterally spaced from each other. The end of each rod 2 is disk-shaped and is pivotably mounted on a bolt 6 which extends through coaxial bores in both bars 4 and 5 and in the intermediate disk-shaped end of rod 2 and is tightened and locked by a spring washer 8 and a nut 7. In addition, two friction disks 9 are mounted on bolt 6 at both sides of the disk-shaped end of rod 2 and are clamped between the latter and the bars 4 and 5. These friction disks 9 are made of such a size as to insure that, when the headrest is subjected to a normal load, it will be maintained in the particular position to which is has been pivoted.

On their free ends and also underneath the bolt 6 the two flat bars 4 and 5 are integrally connected to each other by cross members which form a rear stop 10 and a front stop 11, respectively, for the associated rod 2 and thus the end positions between which the headrest may be pivoted relative to the rods 2, as indicated in solid and dotted lines in FIG. 1.

The rear ends of both pairs of flat bars 4 and 5 are connected by a perforated plate 12 which is firmly secured thereto and extends substantially across the entire width of the headrest and projects at first in a slight curvature upwardly and forwardly, as shown in FIG. 1. This part of the perforated plate 12 determines the shape of the rear side of the headrest 1. At a level of approximately three-quarters of the total height of the rear side of the headrest, the perforated plate 12 is curved downwardly. This end section of plate 12 is also curved in the transverse direction of the headrest so as to increase its stiffness. Therefore, the central part 13 of this section of plate 12 is disposed forwardly of its lateral parts 14 which are welded to the upper end of the upwardly extending arm of each of the two angle brackets 3. Together with these angle brackets 3 the perforated plate 12 forms a bracing element of the headrest 1. This plate 12 is embedded or "foamed" into a molded body 15 which consists of a relative hard, tough foam plastic. As illustrated in FIG. 1, this molded body 15 forms the outer surface of the rear side of the headrest which extends at a substantially uniform distance from the perforated plate 12. This molded body 15 also fills out the space between the end section of plate 12, which is formed by the lateral parts 14 and the central part 13, and the opposite rear section of this plate including a space which extends downwardly along this rear section. Since the molded body 15 continues forwardly from the lower end of plate 12 which is connected to the bars 4 and 5, and thereby not only covers the lower sides of the angle brackets 3 but also forms the lower outer surface of the headrest it defines a large recess 16 in its front side in which the angle brackets 3 are located and through which the bolts 6 are accessible so that the pivotal joint between the rods 2 and the angle brackets 3 may be assembled.

The molded body 15 extends laterally beyond the angle brackets 3 and is therefore provided with a pair of slots in its lower side through which the rods 2 extend. The two lateral ends of the molded body 15 are provided with projecting end walls 17 which, as shown in FIG. 1, give this body a substantially elliptical outer shape, the longitudinal axis of which is shown as being inclined at an angle of approximately 45° relative to the arms of the angle brackets 3. Due to this shape, the projecting end walls 17 project substantially over the other part of the molded body 15 only at the front and upper sides of the headrest.

The headrest according to the invention further comprises a cushion element 18 of a soft material, for example, a foam plastic, the upper rear side of which is made of a curved shape in accordance with the curved front surface of the molded body 15, while the following lower part of this cushion element 18 projects slightly into the recess 16 and closes the same when this cushion element is applied upon the molded body 15. The front surface of the cushion element 18 is curved similar to the front surfaces of the projecting end walls 17 of the molded body 15 so that between these end walls 17 the cushion element also has an oval cross section. However, as shown especially in FIGS. 1 and 3, the cushion element 18 projects slightly beyond the end walls 17.

In the particular embodiment of the invention as illustrated, the cushion element 18 may be removably secured by means of snap buttons to the molded body 15 at the part of the latter which covers the lower sides of the bars 4 and 5 and also at the upper side adjacent to the connection between the exposed rear side of the body and its front side which is covered by the cushion element 18. Of course, the cushion element 18 may also be secured to the molded body 15 in any other suitable manner, for example, by zip fasteners or by being glued or welded thereto. Regardless of the manner in which the cushion element 15 may be secured, it is of particular advantage if it may be installed as the last part of the headrest and also after the supporting rods 2 are installed.

In the embodiment of the invention as illustrated, the cushion element 18 is covered by a highly elastic covering material 19 which, as shown in FIG. 3, is drawn tightly and without folds or creases over the lateral edges of the cushion element 18. The lateral edges 19' of this covering material 19 are covered up by the end walls 17. For preventing the covering material 19 from pressing the lateral edges of the cushion element 18 inwardly, an insert 20 of a harder foam material is embedded into the cushion element at each side thereof. Due to the shape of the cushion element 18 and due to the position of the pivot joints and the shape of the supporting rods 2, the cushion element 18 may be pivoted so far forwardly that it may engage with and support the head or neck of a person occupying the seat even when this person sits in a normal position. The headrest may, however, also be pivoted so far toward the rear that it will be in a comfortable position also when the seat and its backrest are shifted to a reclining position. If the head or neck of the seat occupant is thrown toward the rear against the headrest, the cushion element will adequately distribute and absorb the pressure and vibrations. The molded body 15 and the perforated plate 12 limit the extent of a sudden movement of the head toward the rear and at the occurrence of a severe impact they simultaneously destroy the energy of the impact by being plastically deformed. The headrest according to the invention thus complies with all safety requirements insofar as an impact from the front is concerned. However, even at an impact from the rear the molded body 15 and the perforated plate 12 satisfy all requirements insofar as a distribution of pressure and a deceleration of an impact are concerned. It is especially of advantage that even when the headrest is pivoted to its most horizontal position in which it projects as far as possible forwardly of the backrest, the surface thereof which then projects toward the rear, and especially the lower side, is cushioned by the molded body 15. Furthermore, even when the headrest is in this position, the supporting rods 2 do not project toward the rear beyond the headrest and therefore cannot cause any injury at an impact. Finally it is of advantage that at the occurrence of an impact upon the headrest, the latter will usually be pivoted until the supporting rods 2 engage upon one or the other of the stops 10 or 11. The friction which is then produced in the pivot joints during this pivoting movement also destroys a part of the energy of an impact.

Although our invention has been illustrated and described with reference to the preferred embodiment thereof, we wish to have it understood that it is in no way limited to the details of such embodiment but is capable of numerous modifications within the scope of the appended claims.

Having thus fully disclosed our invention, what we claim is:

1. A headrest comprising a front outer member and a rear outer member extending generally parallel to each other along a substantial part of the entire width of the headrest, the outer members having inner side surfaces which are complementary to each other and which closely confront each other, the rear outer member being molded of a relatively hard, tough foam plastic and the front outer member being molded of a relatively soft resilient material, means for connecting said two members at least at said sides to each other, a bracing element entirely within said headrest and at least partially embedded in said rear outer member and at least partly consisting of a solid material capable of being deformed by a severe pressure, said bracing element partly defining a chamber having an open front side closed by said front outer member, bracket means for securing said headrest to the backrest of a seat, continuously adjustable pivot means connecting the bracing element within said headrest to the bracket means, and yieldable adjustable friction brake means accessible from the outside for securing the headrest in any desired angular position within its range of angular adjustment.

2. A headrest as defined in claim 1, in which said bracing element comprises a plate having apertures and a main surface part curved substantially in accordance with the curvature of the main outer surface part of said first member.

3. A headrest as defined in claim 2, in which when said headrest is disposed in a substantially erect position, the upper end section of said plate is bent downwardly so as to face the rear side of said second member, said end section being reinforced by being curved in the transverse direction of said headrest.

4. A headrest as defined in claim 2, in which said plate is completely embedded in said first member by being foamed into the same when said first member is molded.

5. A headrest as defined in claim 1, in which the front side of said second member only has a width substantially equal to the width of the area required for normally supporting the head or neck of the seat occupant.

6. A headrest as defined in claim 5, in which said first member has lateral wall-like projections at least partly engaging with and embracing the lateral sides of said second members.

7. A headrest as defined in claim 6, further comprising reinforcing means embedded within said second member adjacent to its lateral sides and extending in the peripheral direction of said member.

8. A headrest as defined in claim 1, further comprising a highly elastic fabric covering the outer side of said second member.

9. A headrest as defined in claim 1, in which said first member consists of a foam plastic having an outer surface of an appearance similar to that of synthetic leather.

10. A headrest comprising two outer members each having one side substantially complementary with and adapted to be connected to each other and disposed at the inside of the entire headrest, the first of said members being molded of a relatively hard, tough foam plastic and the second member being molded of a relatively soft resilient material, means for connecting said two members at least at said sides to each other, the front side of said second member only having a width substantially equal to the width of the area required for normally supporting the head or neck of the seat occupant, said first member having lateral wall-like projections at least partly engaging with and embracing the lateral sides of said second member, a bracing element entirely within said headrest and at least partly embedded in said first member and at least partly consisting of a solid material capable of being deformed by a severe pressure, and means secured to said bracing element within said headrest for securing said headrest to the backrest of a seat.

11. A headrest comprising two outer members each having one side substantially complementary with and adapted to be connected to each other and disposed at the inside of the entire headrest, the first of said members being molded of a relatively hard, tough foam plastic and the second member being molded of a relatively soft resilient material, means for connecting said two members at least at said sides to each other, a bracing element entirely within said headrest and at least partially embedded in said first member and at least partly consisting of a solid material capable of being deformed by a severe pressure, said bracing element partly defining a chamber having an open front side closed by said second member, and means secured to said bracing element within said headrest for securing said headrest to the backrest of a seat, said bracing element comprising a plate having apertures and a main surface part curved substantially in accordance with the curvature of the main outer surface part of said first member, said headrest being disposed in a substantially erect position, the upper end section of said plate being bent downwardly so as to face the rear side of said second member, said end section being reinforced by being curved in the transverse direction of said headrest, said plate being completely embedded in said first member by being foamed into the same when said first member is molded, the front side of said second member only having a width substantially equal to the width of the area required for normally supporting the head or neck of the seat occupant, said first member having lateral wall-like projections at least partly engaging with and embracing the lateral sides of said second members, and comprising reinforcing means embedded within said second member adjacent to its lateral sides and extending in the peripheral direction of said member.

* * * * *